May 22, 1934.　　　K. T. POTTHOFF　　　1,959,799

METHOD AND APPARATUS FOR TREATING MATERIAL

Filed Oct. 19, 1928　　5 Sheets-Sheet 3

INVENTOR
Kurt T. Potthoff,
BY
   ATTORNEY

Patented May 22, 1934

1,959,799

UNITED STATES PATENT OFFICE 1,959,799

METHOD AND APPARATUS FOR TREATING MATERIAL

Kurt T. Potthoff, Brooklyn, N. Y.

Application October 19, 1928, Serial No. 313,513

38 Claims. (Cl. 204—5)

This invention relates to methods and machines or apparatus for conveying and treating articles and more particularly to plating apparatus and means for conveying carriers for the articles to be plated, though it is noted that the invention is not limited to plating apparatus nor in some respects to conveying apparatus.

Objects of the invention are to provide an improved conveyor for conveying the carriers along the tanks and improved transfer means for depositing the carrier over a tank and lifting the carrier from the tank and transferring the carrier from one position to another along the apparatus.

Another object of the invention is to provide in an electrolytic apparatus of this kind an improved carrier moved forward by the conveyor means and comprising separately charged and insulated material carrying conductors from which are hung articles for receiving different treatment in tanks placed side-by-side.

Another object of the invention is to provide an apparatus and method of this kind wherein articles are treated in a succession of tanks and conveyed therethrough by conveyors movable at different speeds, to permit the length of treatment to be varied without varying the length of the tanks, and more specifically stated, to permit a long treatment in a tank without a great increase in the length of the tank.

Other objects of the invention are to improve generally the simplicity, reliability, economy and efficiency of such methods and apparatus and to provide an apparatus of this kind which is economical, durable and reliable in operation, and economical to manufacture.

Still other objects of the invention will appear as the description proceeds; and while herein details of the invention are described and claimed, the invention is not limited to these, since many and various changes may be made without departing from the scope of the invention as claimed in the broader claims.

The inventive features for the accomplishment of these and other objects are shown herein in connection with an improved plating apparatus which, briefly stated, includes a plurality of series of tanks placed side-by-side, and main conveyor chains guided in vertical planes at opposite sides of the apparatus and each having a main course passing over and under upper and lower pairs of sprockets to form gaps in said main courses in which are disposed retarding means including short chains having upper courses forming continuations of said main courses and driven at less speed than the main courses. Pusher fingers connected to opposite links of the respective chains and pointing upwardly in said courses push forward carrier bars laid across separately charged independent bus bars disposed along a side edge of the tanks of each series.

The carrier bars carry the articles to be treated, and each carrier bar comprises a rod and separate tubular conductors thereon, one conductor for each series of tanks, the tubular conductors being insulated from said fingers and each other and each slidable on one bus bar.

The means for transferring the carrier bars from over one tank to over another and from one course to another comprises a pair of revolving transfer arms, a socket plate pivoted on each arm and having an upwardly open recess to receive the carrier bar, and means whereby said recess is kept pointing upward while the bar is thus received.

With this apparatus it is possible to simultaneously convey at the same speed a plurality of groups of articles arranged side-by-side respectively through a plurality of series of corresponding tanks arranged side-by-side, and subject the groups to different liquids and voltages while in the corresponding tanks. It is also possible, either with one or more series, to convey the articles more slowly while passing through some of the tanks than while in others.

The pushers and transfer means are so spaced and synchronized and intermittently driven as to bring the pushers and bars thereon to rest at the loading end, and to bring the pushers to positions ready to give up carrier bars to the transfer means at the loading end and to receive carrier bars from the tansfer means at the emerging end, the transfer means being so spaced as to deposit the carrier bars at points where succeeding pushers or transfer means will carry them on. They may be brought to rest for a period at various points by the intermittent drive for lengthening the treatments at these points.

In the accompanying drawings showing, by way of example, one of many possible embodiments of the invention.

Figure 3:
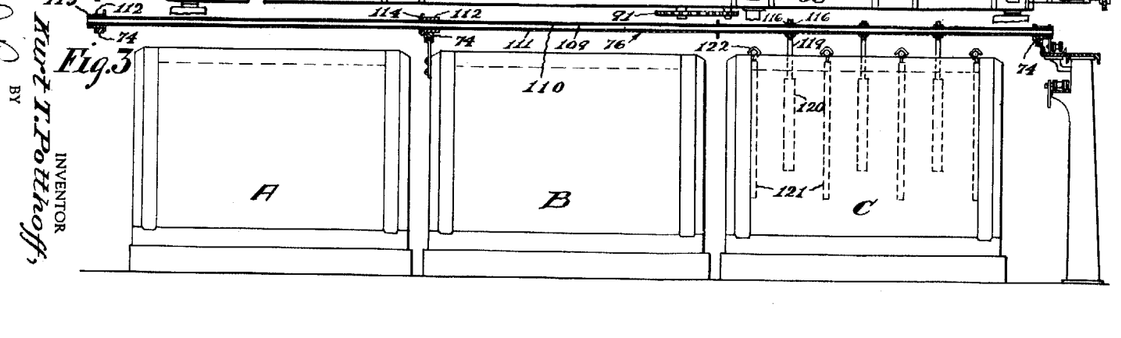
Fig. 3 is an end elevation of the tanks

My improvements are shown in combination with a plurality of series of tanks A, B and C (Fig. 3) the several series being placed side-by-side and adapted for separate different simultaneous operations, such for instance, as nickel plating, galvanizing and brass plating.

The tanks of each series are disposed end for end in a straight line and may include, for instance, an electrocleansing tank 10 at the loading end 11, a rinsing tank, a dip tank and a cold rinse tank (not shown), a neutralizing tank 14, a long plating or galvanizing tank 15, another cold rinse tank 16 and a hot rinse tank 17 at the emerging end 18 of the series; though it is noted that the invention is in no way limited to the number and uses of the tanks.

The conveying system is carried on a frame comprising base pedestals 20 arranged along the outer sides of the outer series of tanks and at the corners of the apparatus and carrying a horizontal beam 21 on each side of the apparatus, in turn supporting upper pedestals mounted 22, 23, 24 on said beams respectively over the base pedestals, some of the pedestals 24 being short and others 22 and 23 being tall, tie rods 25 connecting the upper ends of opposite tall pedestals.

A drying chamber open at both ends may be disposed above the tanks between the upper part of the taller pedestals as shown in my co-pending application Serial No. 313,515 filed Oct. 19, 1928, or an end tank 17 may be a drying chamber, though the invention is not limited to the presence or absence of a drying chamber.

Bearing brackets 28 mounted on outer top faces of the upper corner pedestals 22 support bearing blocks 29 adjustably slidable on said brackets by means of screws 30 carrying inwardly pointing short shafts 31 mounted in the bearing blocks. Cross-drive shafts 35 extending transversely of the machine at the loading and emerging ends and rotatably mounted in the lower ends of the upper corner pedestals 22 carry drive sprockets 36 fast thereon; while idle sprockets 37 are loose on said short shafts 31. Endless conveyor chains 38 move in vertical planes at opposite sides of the apparatus, passing under said drive sprockets 36 and over the other sprockets 37.

Main longitudinal drive shafts 40 rotatably mounted longitudinally of said beams carry, in gear housings 41, worms fast on said main shafts and worm wheels fast on the cross drive shafts 35.

An intermittent motor 45 is connected by a chain 46 and sprockets 48 to cross shaft 50 disposed between the ends of adjacent tanks, this shaft 50 being in turn connected by a reducing worm drive 51 to said longitudinal shafts 40 for intermittently driving said longitudinal shafts and consequently the sprockets 36 and conveyor chains 38. The intermittent motor is started by means of a control switch set in operation by a control lever 52 having an end roller 53 engaged by one of the carrier bars 76 later to be described.

The movement of the control lever causes the motor to stop, and timing means associated with the motor causes the motor to start again after the desired period of rest. The motor control means is well known, so need not be described here.

Figure 9:
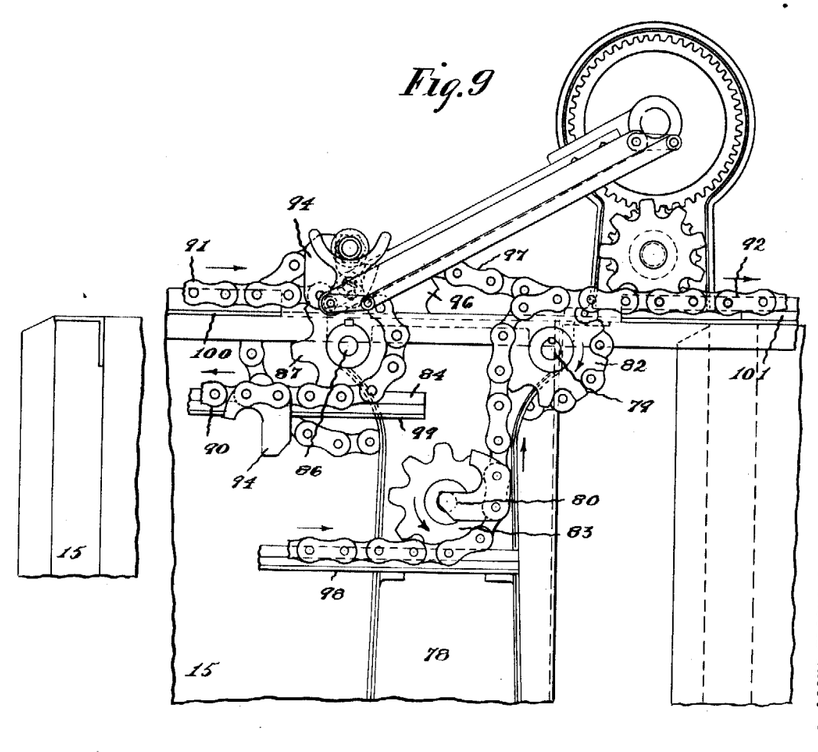
Fig. 9 is a fragmental side elevation showing the drive means for the retarding means.
Figure 10:
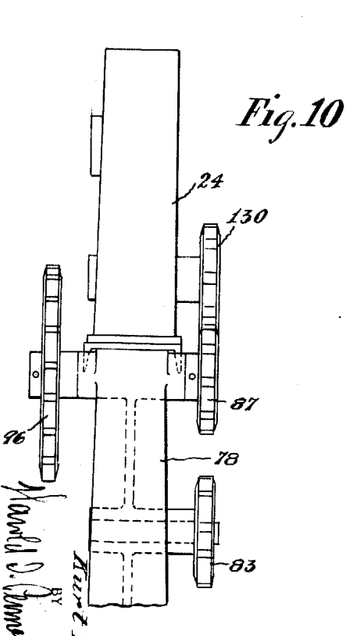
Fig. 10 is a fragmental edge elevation showing the mounting of sprockets for said retarding and drive means.

The pushers or plates 70 (Figs. 1, 7 and 9) of insulating material are connected to opposite links of the respective chains 38 and formed with deep recesses 71 (Fig. 7) and rearwardly thereof with pusher pins, or fingers, 72 forming shoulders disposed perpendicular to the horizontal planes of the chains in a plane parallel to and near the vertical plane of the separate chains and pointing upwardly and downwardly in the upper and lower courses respectively.

Figure 4:
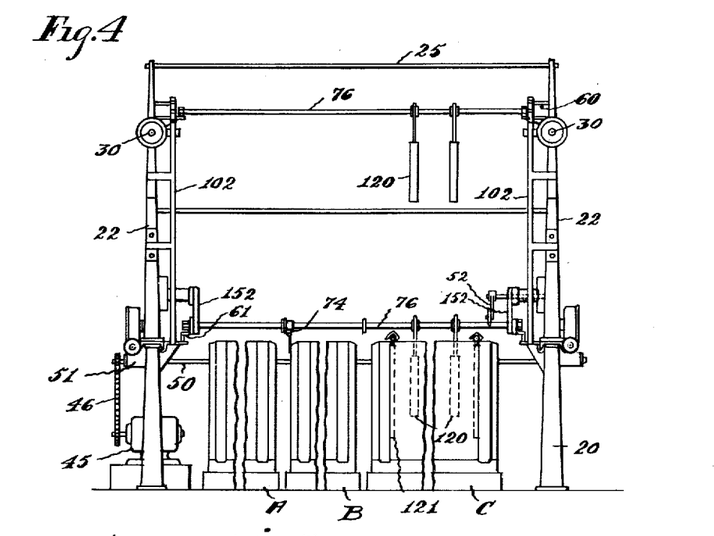
Fig. 4 is a fragmental end elevation of the apparatus
Figures 5, 6:
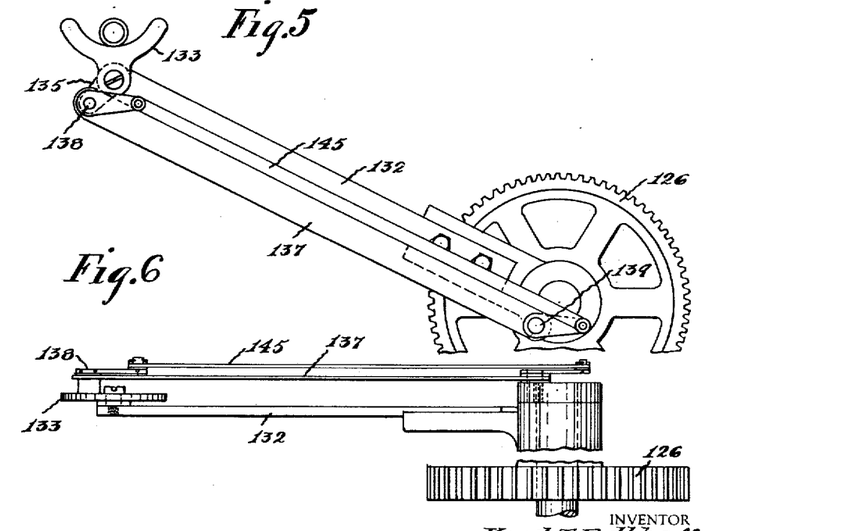
Fig. 5 is a fragmental side elevation of one form of transfer means;
Fig. 6 is a bottom plan of the same.

Bus bars 74 (Figs. 1, 2 and 4), arranged on and insulated from the pedestals, near and parallel to the outer side edges of the outer series A and C tanks and one of the side edges of the inner series B, and having raised portions 75, for a purpose to be explained, slidably support carrier bars 76 laid across the bus bars perpendicular thereto and adapted to be pushed forward by the pushers and raised from the bus bars by the pushers at the emerging end of the series.

It is sometimes desirable to provide an auxiliary retarding conveying means to retard the passage of the articles through one or more of the tanks to permit long treatment in such tanks without lengthening the tank to any great extent. In order to provide space for such a retarding auxiliary conveying means, later to be described, the main course of the main chains are depressed to form the depressed course over which is disposed the retarding means. To accomplish this I provide a pair of special pedestals 78 (Figs. 1 and 9) on each side of, for instance, the tank 15 terminating about on a level with the main course of the chains, each pedestal carrying upper and lower short shafts 79, 80, 81 on which are received tangentially off-set upper and lower sprockets 82, 83, over and under which respectively the chains pass to form the depressed courses, whereby gaps 84 are formed in the main courses of the chains.

The auxiliary retarding conveying means is disposed in said gaps and comprises a pair of parallel transverse shafts 85, 86 disposed at the same level and carrying sprockets 87 in the vertical plane of the chains respectively, said sprockets carrying short chains 90 having their upper courses 91 forming continuations of the main course 92 of the main chains, and provided with pushers 94 similar to those of the main chains, the pushers of the retarding course being closer together and traveling slower than the others.

The speed reducing drive means for the retarding means includes a small drive sprocket (behind the sprocket 82) on the shaft 79, a large sprocket 96 on the shaft 86, and a chain 97 connecting them, whereby the short chain is driven by the main chain at a reduced speed.

Tracks 98, 99, 100 (Fig. 9) 101 (Fig. 8) mounted on the pedestals and disposed under all of the horizontal courses of all of the chains, and tracks 102 disposed against the end courses 103 engage the rollers of the chains for slidably supporting the courses.

Upper and end tracks 105, 106 (Fig. 1) mounted on the faces of the upper pedestals are adapted to engage the ends of the carrier bars to hold them in the recesses 71 (Fig. 7) as the pushers pass to, from, and between, the upper sprockets 37.

Each carrier bar 76 comprises a central supporting rod 109 (Fig. 3) on which is disposed an insulating covering 110 extending from end to end thereof, on which covering are disposed separate tubular cathode-carrying conductors 111 one for each series of tanks extending across the tanks of each series, each conductor being provided with a polygonal contact shoe 112 each slidable on one of the bus bars 74 exclusively.

Engagement heads 113 on the outer ends of said coverings are engaged by said pushers 70, whereby the carrier bars are pushed along the bus bars.

Insulating collars 114 between the ends of the tubular conductors, and if desired between the conductors and said heads, co-operate with said covering to insulate the tubular conductors completely and separately.

Spacing rings 116 fast on the tubular conductors 111 prevent longitudinal shifting on the conductors of hangers or hooks 119 loosely and removably hung on the conductors to carry cathode material or articles 120 to be plated between anodes 121 hung on anode supporting bars 122 extending longitudinally of the electrolytic tanks between the paths of the cathode material. Independent current supply means supplies electric current to the bus bars and anode bars of the series A, B and C, said current supply means for each series of tanks being independent from the supply means of the other series to permit plating operations requiring different voltages to go on at the same time.

The means for picking up the carrier bar with the material therefrom from the pusher pin and transferring it from one tank to the succeeding tank will now be described.

Figure 7:
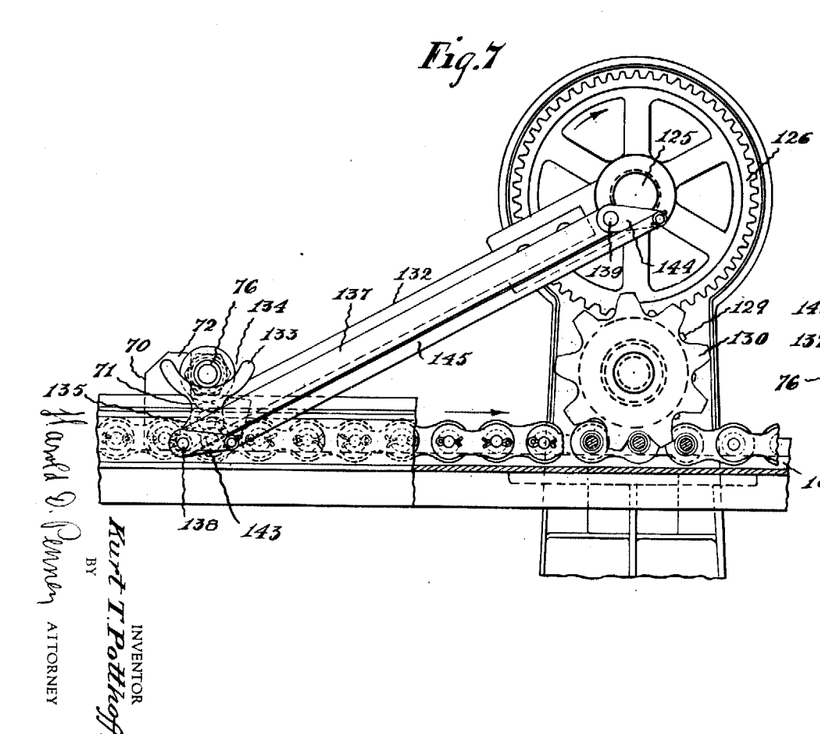
Fig. 7 is a side elevation of the transfer means in position to pick up a carrier bar.
Figure 8:
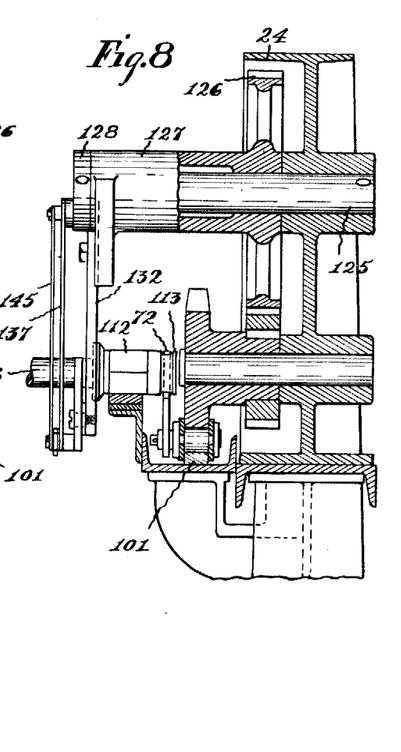
Fig. 8 is a fragmental end elevation, partly in vertical section of said transfer means.

Said means as shown in Figs. 7 and 8 includes an inwardly pointed stationary shaft 125 mounted on the upper pedestals 22, 24. On each shaft is mounted a spur gear 126 having a projecting hub 127 rotatable on said shaft and held in place by a collar 128 fast on the inner end of the stationary shaft.

A pinion 129 engaged by the lower part of the gear 126 is mounted fast on the hub of a sprocket 130 meshing with the conveyor chain 38, whereby the spur gear is rotated in the direction in which the lower course of the conveyor chain travels, as shown by the arrows of Fig. 7.

A transfer arm 132 fast on said hub 127 carries a socket plate 133, which may be of insulating material, pivotally mounted on the outer end of the arm in a plane parallel thereto and having an upwardly open socket recess 134 adapted to receive the bar 76, and a lower extension 135 disposed in the plane of the plate and slanting away from the main axis of the plate.

A control bar 137 parallel to the arm is pivoted at the outer end to a pin 138 fast on the free end of said extension and at the inner end to a fixed pin 139 on said collar on a fixed radius of the fixed shaft parallel to said extension.

The distance between pivotal centers of said arm 132 and said bar 137 being equal, and the distance between the pivotal centers of said extension 135 and said radius being equal, whereby said arm, bar and extension are parts of a parallelogram, and said extension is maintained parallel to said recess radius, and the recess 134 is kept pointing upward when the extension is away from its dead center. To keep the recess upward while the extension is on its dead center, I provide parallel links 143, 144 of equal length pointing in the same direction and mounted fast on said fixed pins 138, 139 respectively, the free ends of said links being connected by an auxiliary link bar 145, whereby another parallelogram is formed for controlling the socket plate while on said dead center, whereby the socket is always kept with said recess 134 upward.

Figures 1, 11, 12:
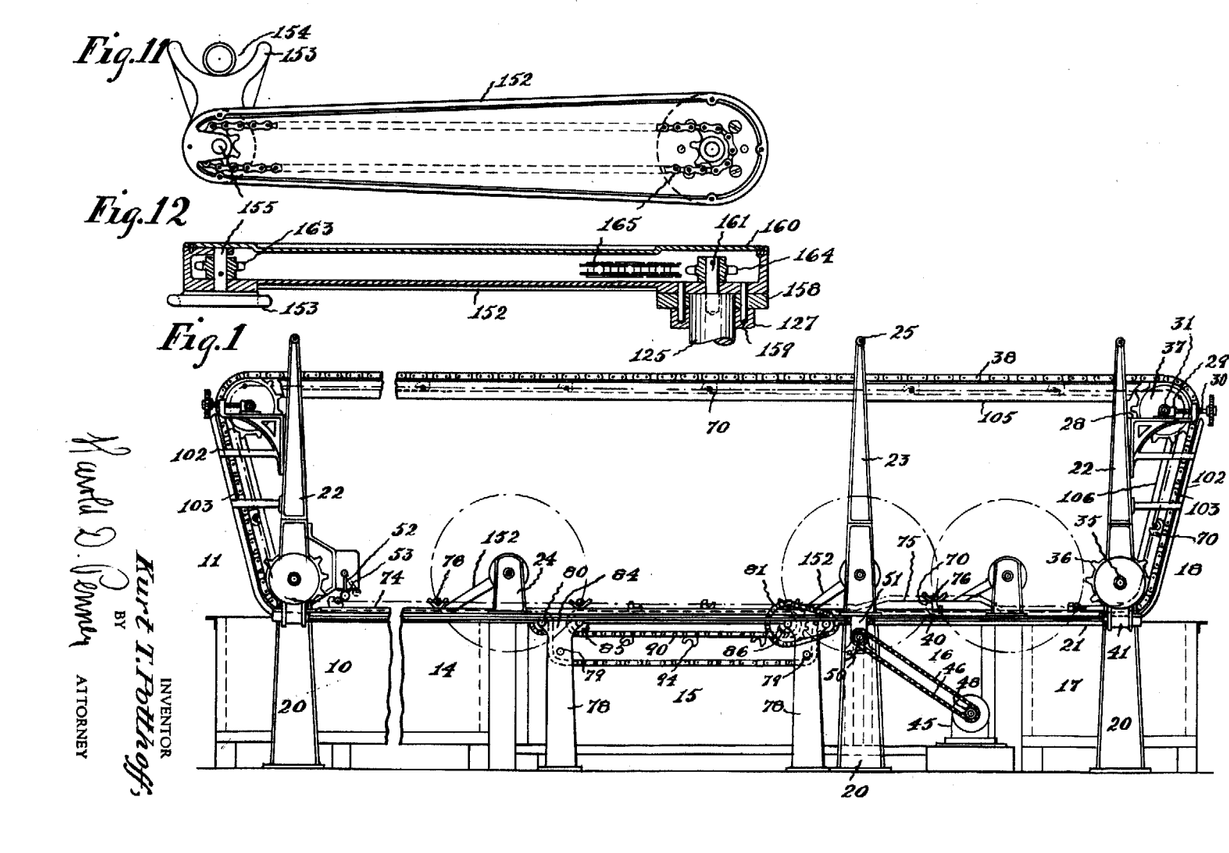
Fig. 1 is a somewhat diagrammatic side elevation of the apparatus
Fig. 11 is a side elevation showing another form of transfer means, parts being removed.
Fig. 12 is a longitudinal sectional view thereof.
Figure 2:
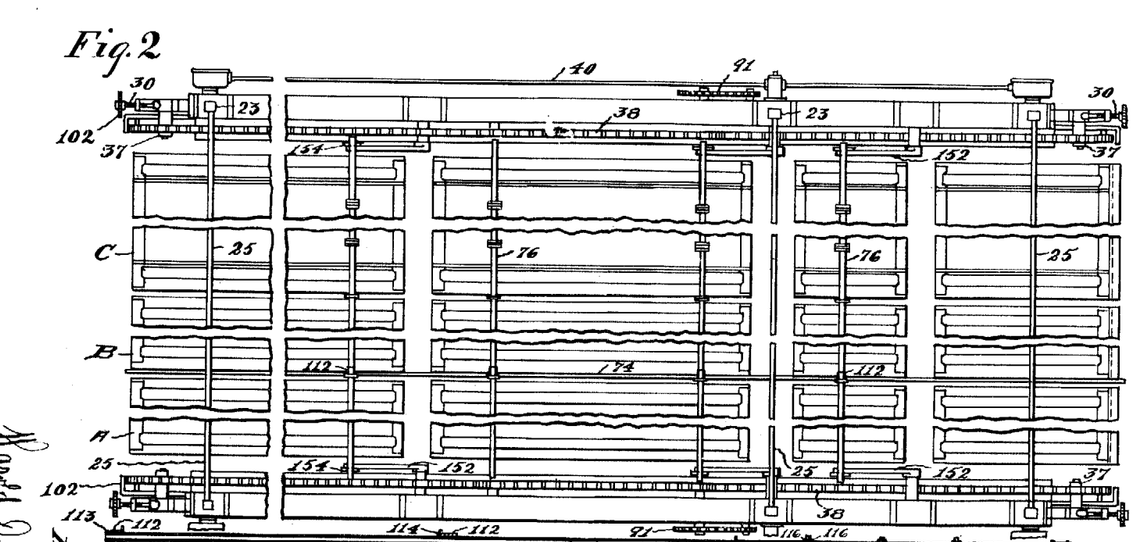
Fig. 2 is a plan of the apparatus;

The transfer arm of Figs. 1, 11 and 12 comprises a combined casing and transfer arm 152 carrying the socket plate 153 having a recess 154 and fast on a pin 155 pivotally mounted on the outer end of the casing and extending into the casing. The arm itself is mounted fast on a collar 158 and the hub 127 by means of pins 159 extending through the collar into the hub. The casing 152 is provided with a removable cover 160.

A pair of control sprockets 163, 164 of equal diameter and number of teeth secured fast to said pin 155 and a pin 161 fast in the shaft 125, are connected by a sprocket chain 165, whereby the recess 154 is kept pointing upward.

The pushers 70 of the main chain 38 and retarding chains 90 are so spaced, and said transfer arms, chains and intermittent drive so timed as to bring the chains to rest when the pushers are at the loading end 11, for the loading and reception of articles to be plated, and at positions ready to give up carrier bars to transfer arms adapted to pick them up and to receive carrier bars from transfer means about to deposit them, whereby the articles are brought to rest at these points to give more time for loading, and for the articles to be acted upon in the tanks or drying chamber whereby the length of the apparatus may be reduced to a minimum.

The transfer arms are synchronized to pick up carrier bars at the same time, whereby the arms are all parallel, and the last pair passes through about a third of a revolution before picking up the bar deposited by the immediately proceeding pair, whereby the material is left in the tank 16 the required period of time. The solutions in the tanks are made of a strength respectively to accord with said periods of the materials in said tanks and have the required amount of action within said periods. All of these periods may be lengthened to any desired extent by having the intermittent drive to bring the articles to rest while in the tank. The period for any individual tank may be lengthened or retarded by the tank longer by providing the auxiliary retarding means and short chains 91 as at the tank 15, which may be geared, by the proper sized gears.

The operation of the apparatus is simple, and obvious from the foregoing. The baths and voltages of the several series A, B and C are prepared and adjusted for the particular plating material to be used which may be different for each series. The carrier bars 76 remain with the pushers 70 except when over the raised portion 75 of the bus bar 74. The intermittent drive brings the pushers and carrier bars to rest well above the tank 10 at the loading end 11 of each series A, B and C, where plated articles which have come down the course 103 are unloaded and new articles to be plated are loaded on the carrier bars, all by a single operator if desired.

On the next movement of the conveyor, the articles are lowered into the tank 10 and there brought to rest during the period of rest of the chain and until picked up as the transfer arm at the emerging end of that tank moves upward on the next movement of the conveyor. If the tank 10 is a long tank, this will be more than one period of rest while the carrier bar remains on the same pair of the pushers 70.

On said next movement, the carrier bar will be picked up by the transfer arms and the articles transferred to intermediate tanks (not shown) and then to the electro-cleaning tank 14, the carrier bar resting on the pusher 70 which will be there to meet it.

On the next movement, the carrier bars are transferred from pushers 70 over the tank 14 to the pushers 94 on the slow short chains 91 over the tank 15. Thus the articles are held for a long period in the plating tank 15. There may be one or more periods of rest while the carrier bars are on the short chains.

On the next cycle of movement after the articles reach the emerging end of the tank 15, they are transferred to, and brought to rest in the tank 16, and held away from the pushers 70 by resting on the raised portion 75. This or any similar tank may be made long enough to provide more than one pair of transfer arms and more than one station of rest, in order that the articles may be subjected to more than one period of treatment therein.

The articles are next transferred to, and brought to rest in the last tank 17. The carrier bar, instead of being held away from the pushers 70 by resting on the elevated portion 75 as at tank 16 is lowered directly into the recess 71 of the pusher, which is located and timed to receive it.

On succeeding movements of the conveyor chain, the carrier bars will be carried up the emerging end course 103 at the end 18, along the upper course and then again down the course 103 at the end 11, where they are brought to rest for unloading, after which the above operation is repeated.

The polygonal contact head 112 provides a plurality of contact faces any one of which is adapted to make good, extended contact with the bus bar.

Special advantage of the transfer means 132 is that by changing the ratio of gears 126, 129 it is possible to cause the transfer means to act quickly or slowly and transfer the carrier bar from one pair of pushers to adjacent pushers or to skip one or more pairs as desired.

While the lever 52 and the intermittent drive are here shown as controlled by the carrier bar rather than the pusher 70, the invention is not thus limited.

There may be more pushers than are required for some jobs, the number of carrier bars and the gear ratios being suited to the particular job. As the intermittent drive is controlled by the carrier bar itself engaging the roller 53, the number of carrier bars is immaterial to the control of the motor.

More pedestals 24 can be provided than are necessary for some jobs, and transfer means added or removed as required without interfering with the operation of other parts of the apparatus.

While herein, in the specification and claims I mention tanks in which the articles are immersed rather than spraying or treating stations or zones where the articles may be sprayed or otherwise treated, it is understood that such stations may sometimes be substituted and the claims herein are to be broadly construed as covering such stations when possible.

I claim as my invention:

1. An apparatus comprising a pair of revolving transfer arms; a socket plate pivotally mounted on the outer end of the arm and having an upwardly open socket recess adapted to receive an end of a bar; a sprocket and chain connection between said socket plate and stationary shaft, whereby said recess is pointed upward.

2. A transfer means comprising a pair of alined stationary shafts, a hub rotatable on each shaft; a radial transfer arm fast on said hub; a socket plate pivotally mounted on the outer end of the arm and having an upwardly open socket recess; a pair of control sprockets of equal diameter secured respectively fast on said socket plate and stationary shaft; and a sprocket chain connecting said sprockets.

3. An apparatus comprising a stationary shaft; a hub rotatable on said shaft; means whereby the hub is rotated; a radial transfer arm fast on said hub; an insulating socket plate pivotally mounted on the outer end of the arm and having an upwardly open socket recess adapted to receive an end of the bar; a pair of control sprockets of equal diameter secured respectively fast on said socket plate and stationary shaft; and a sprocket chain connecting said sprockets, whereby said recess is kept pointing upward.

4. An apparatus comprising a series of tanks; main conveyor chains having main courses at opposite sides of the apparatus and provided with gaps therein; retarding chains in said gaps having short courses forming continuations of said main courses; pushers on said chains; bus bars along sides of the tanks; carrier bars across the bus bars and moved forward by the pushers; and means for transferring carrier bars and articles thereon from one tank to another and from each of said courses to the other.

5. An apparatus comprising a series of tanks; main conveyors having main courses at oppostie sides of the apparatus and provided with gaps therein; retarding conveyor means in said gaps having short courses forming continuations of said main courses; bus bars along the sides of the tank adjacent to said gaps; conducting carrier bars across the bus bars moved forward by the conveyors; and means for transferring carrier bars and articles thereon from each course to the other.

6. An apparatus comprising a series of tanks comprising a long tank and short tanks; main conveyor chains each having a main course guided at opposite sides of the apparatus; sprockets over and under which said courses pass to form gaps therein at the side of the long tank; retarding means in said gaps including short chains having upper courses driven at less speed than, and forming continuations of, said main courses; pusher pins connected to opposite links of the respective chains; carrier bars across the tanks pushed forward by the pins; means for transferring carrier bars from one course to another; said means comprising forwardly revolving transfer arms each having an end recess adapted to receive said bars; and intermittent means for driving the chains and arms.

7. An apparatus comprising a series of tanks; main conveyor chains guided in vertical planes at opposite sides of the apparatus; sprockets over and under which the main courses of the chains pass thereby to form gaps in said courses; retarding conveyor means in said gaps including short chains having upper courses forming continuations of said main courses; means for driving the short chains at less speed than the main chains; pusher pins connected to opposite links of the respective chains and pointing upwardly in said courses; carrier bars across the tanks pushed forward by the pins; and means for transferring the carrier from one course to another.

8. An apparatus comprising a series of tanks; main conveyor chains having main courses at opposite sides of the tanks a pair of special pedestals on the sides of one of the tanks; upper and lower sprockets on each pedestal over and under which the chains pass to form depressed courses and gaps in the main courses; retarding means in said gaps comprising pairs of auxiliary sprockets; short chains on said sprockets having their upper courses forming continuations of said main courses; means for rotating the auxiliary sprockets and driving their chains at less speed than the main chains; plates connected to opposite links of the respective chains and formed with pusher pins pointing upwardly in the main and continuation courses; the pusher pins of the continuation course being closer together than the others; a bus bar near and parallel to the tanks; carrier bars across the bus bars and pushed forward by the pusher pins; and means for transferring the bars from one course to another.

9. An apparatus comprising a tank; main conveyor chains at opposite sides of the apparatus; a pair of special pedestals on the outer side of one of the tanks; upper and lower sprockets on each pedestal over and under which the chains pass to form depressed courses and gaps in the main courses; short chains on said sprockets having their upper courses forming continuations of said main courses; sprocket and chain means driven by the main chains for rotating the auxiliary sprockets and driving their chains; pusher pins connected to opposite links of the respective chains and pointing upwardly in the main and continuation courses; carrier bars across the tanks and pushed forward by the pusher pins; and means for transferring the bars from one course to another.

10. An apparatus comprising a tank; main conveyor chains at opposite sides of the apparatus; a pair of special pedestals on the outer side of one of the tanks; upper and lower sprockets on each pedestal over and under which the chains pass to form depressed courses and gaps in the main courses; short chains on said sprockets having their upper courses forming continuations of said main courses; pusher pins connected to opposite links of the respective chains and pointing upwardly in the main and continuation courses; tracks mounted on the pedestals and disposed under all of the adjacent horizontal courses of all of the chains for slidably supporting the courses; carrier bars across the tanks and pushed forward by the pusher pins; and means for transferring the bars from one course to another.

11. An apparatus comprising a series of tanks; conveyor chains having a main course guided at opposite sides of the tank; pusher pins connected to opposite links of the respective chains; carrier bars across the tank pushed forward by the pins; means for transferring carrier bars from over one tank to over another, said means comprising forwardly revolving transfer arms each having an end recess adapted to receive said bars; and intermittent means for driving the chains and arms; the pusher pins and arms being so spaced and said arm and chains being so timed as to bring the pusher pins to rest while the carrier bars are thereon and intermediately of the ends of the tanks.

12. An apparatus comprising a series of tanks comprising a long tank and short tanks; main conveyor chains each having a main course guided at opposite sides of the apparatus; pusher pins connected to opposite links of the respective chains; cathode carrier bars across the tanks pushed forward by the pins; means for transferring carrier bars from over one tank to over another; said means comprising forwardly revolving transfer arms, each having an end recess adapted to receive said bars; and automatically intermittent means for driving the chains and arms; the pusher pins being so spaced and said arm and chains being so timed as to bring the pusher pins to rest at the loading end of the apparatus.

13. An apparatus comprising a tank; conveyor chains at opposite sides of the tank, and insulated pushers secured to the chains.

14. An apparatus comprising a series of tanks; conveyor chains at both sides of the tanks; pushers on opposite points of the respective chains; carrier bars across the tanks moved forward by the pushers; transfer means operated by the chains for picking up and transferring carrier bars from pushers over one tank and transferring them to pushers over another tank; a self starting drive means for driving said chain; and means controlled by the bars for stopping the drive means.

15. An apparatus comprising a series of tanks; conveyors and track bars at both sides of the tanks, the track bars including opposite elevated locations; pushers on opposite points of the respective conveyors; carrier bars across the track bars moved forward by the pushers; transfer means for picking up and transferring carrier bars from a pusher or tank to another tank or pusher; the transfer means being so positioned and timed that the respective transfer means will deposit and pick up the same carrier at said elevated locations; said locations being elevated to hold the carrier bar out of the reach of the pushers.

16. An apparatus comprising a tank; a frame comprising members arranged along the sides of the tank; shafts mounted at the upper corners of the apparatus, and at both ends at about the level of the top of the tank; sprockets on the shafts; conveyor chains at opposite sides of the apparatus and passing under the lower sprockets and over the upper sprockets; means for driving the chains; pusher pins connected to opposite links of the respective chains and pointing upwardly and downwardly in the lower and upper courses respectively; carrier bars across the tank and pushed forward by the pushers; and tracks mounted on the upper part of the frame and adapted to engage under the ends of the carrier bars and hold them in engagement with the pusher pins as they pass between the upper sprockets.

17. A conveying apparatus comprising a tank; a frame; shafts mounted at the upper and lower corners of the apparatus; sprockets on the shafts; conveyor chains at opposite sides of the apparatus and passing under the lower sprockets and upwardly over the upper sprockets; means for driving the chains; pusher plates connected to opposite links of the respective chains and having recesses and fingers just to the rear of the recesses, both facing inwardly at the end courses of the chain; transverse carrier bars pushed forward by the pusher plates; retaining end tracks mounted on the upper part of the frame and adapted to engage the ends of the carrier bars and hold them in the recesses as the pusher plates pass upwardly and downwardly; and tracks engaging the outer face of the chains at the end courses to hold the pushers near the retaining tracks.

18. An apparatus comprising a tank; a frame comprising members arranged along the sides of the tank; shafts mounted at the upper corners of the apparatus, and at both ends at about the level of the top of the tank; sprockets on the shafts; conveyor chains at opposite sides of the apparatus and passing under the lower sprockets and over the upper sprockets; means for driving the chains; pusher plates connected to opposite links of the respective chains and each having a recess and a finger just to the rear of the recess pointing upwardly and downwardly in the lower and upper courses of the chain respectively and inwardly at the end courses; carrier bars across the tank and pushed forward by the pushers; upper and end retaining tracks mounted on the upper part of the frame and adapted to engage the ends of the carrier bars and hold them in the recesses as the pusher plates pass upwardly and downwardly, and between the upper sprockets; and tracks engaging the outer face of the chains at the end courses to hold the pushers near the retaining tracks.

19. A method comprising simultaneously conveying in the same direction a plurality of articles arranged side-by-side respectively through a plurality of series of tanks, said series being arranged side-by-side, corresponding tanks being arranged side-by-side; and subjecting the articles to different treatments in the respective series.

20. A method comprising simultaneously conveying in the same direction at the same speed a plurality of articles arranged side-by-side respectively through a plurality of series of tanks, said series being arranged side-by-side, corresponding tanks being arranged side-by-side and subjecting the articles of the respective series to different liquids and voltages while in some of the corresponding tanks.

21. An apparatus comprising series of tanks placed side-by-side; conveyors at opposite sides of the apparatus; a bus bar along a side of a tank of each series; and carrier bars across the bus bars moved forward by the conveyors; each carrier bar comprising a core rod; separate tubular cathode-carrying conductors, one for each series, on and insulated from said rod and each other and each provided with a contact shoe slidable on one of the bus bars; anodes in the tanks; and independent current supply means for the bus bars of each series.

22. A carrier bar comprising a rod; and a tubular cathode-carrying conductor insulated from said rod.

23. A carrier bar comprising alined separately charged and insulated material carrying conductors.

24. A carrier bar comprising a core rod; and separate tubular cathode-carrying conductors on and insulated from said rod and each other and each provided with a contact shoe.

25. An apparatus comprising a tank; a frame comprising members arranged along the sides of the tank; inwardly pointing short shafts mounted at the upper corners of the apparatus; cross-drive shafts across the apparatus at both ends at about the level of the top of the tank; drive sprockets fast on the drive shafts and idle sprockets loose on the short shafts; conveyor chains in vertical planes at opposite sides of the apparatus and passing under said drive sprockets and over the other sprockets; pusher pins connected to opposite links of the respective chains and pointing upwardly and downwardly in the lower and upper courses respectively; carrier bars across the tanks and pushed forward by the pusher pins; a main drive shaft disposed longitudinally of the apparatus and geared to both cross shafts; and means for driving the main shaft.

26. An apparatus comprising a series of tanks; chains at opposite sides of the tanks and carrying pushers; transverse carrier bars disposed across and moved forward by the pushers; and means for lifting up the carrier bars from pushers at one part of the apparatus and transferring it to pushers at another part, said means comprising revolving transfer arms revolving on axes above the said chains.

27. An apparatus comprising a pair of means for lifting a carrier bar from one location and placing it at another location, each means comprising a member having a recess for receiving said bar, and means for holding said member always substantially parallel to a given line during said lifting and placing.

28. A transfer means comprising a stationary member; a transfer arm revoluble on said member; a pivoted member pivotally mounted on said arm and having a vertical axis and an upwardly open recess; and means for maintaining said pivoted member with said axis vertical as the arms revolve.

29. An apparatus comprising a tank; a carrier over the tank; means for lifting the carrier from one location and placing it at another location, said means comprising an insulated member engaging and lifting the carrier.

30. A transfer means comprising a stationary member; a transfer arm revoluble on said member; a pivoted member pivotally mounted on said arm and having an upwardly open recess; and means carried entirely by said members and connecting said members for maintaining said recess in upwardly open position.

31. A transfer means comprising a stationary member; a transfer arm revoluble on said member; a pivoted member pivotally mounted on said arm and carrying thereon a member having an upwardly open recess; and means connecting different offset eccentric points on said pivoted member to corresponding points on the stationary member for maintaining said recess in upwardly opening position.

32. A transfer means comprising a pair of stationary members; a transfer arm revoluble on each member; a pivoted member pivotally mounted on each arm and carrying thereon a member having an upwardly open recess therein; and flexible means connecting different offset points on each pivoted member to corresponding points of the associated stationary member whereby said recess is maintained in upwardly open position.

33. A transfer means comprising a stationary member; a transfer arm revoluble on said member; a pivoted member pivotally mounted on said arm and having an upwardly open recess; and chain and sprocket means connecting said members for maintaining said recess in upwardly open position.

34. A method comprising conveying articles arranged side-by-side simultaneously in the same direction through a pair of tanks arranged side-by-side; and subjecting the respective articles to different voltages in the respective tanks.

35. An apparatus comprising at least two tanks placed side-by-side; and transverse carrier bars each movable over both tanks simultaneously and conveyer means engageable with the ends of the bars for driving the bars.

36. An apparatus comprising tanks placed side-by-side; a carrier movable over both tanks simultaneously, and comprising article-carrying conductors over the tanks respectively and insulated from each other.

37. An apparatus comprising a series of tanks; conveyor chains at both sides of the tanks; pushers on opposite points of the respective chains; carrier bars across the tanks moved forward by the pushers; transfer means for picking up and transferring carrier bars from pushers over one tank and transferring them to pushers over another tank; a self starting drive means for driving said chain; and means controlled by the bars for stopping the drive means; the drive means automatically restarting after a predetermined period.

38. A method comprising simultaneously conveying in the same direction at the same speed a plurality of articles arranged side-by-side respectively through a plurality of series of tanks, said series being arranged side-by-side, corresponding tanks being arranged side-by-side and subjecting the articles of the respective series to different liquids and voltages while in some of the corresponding tanks of the respective series; said method resulting in the new function of allowing the same control which controls one plating method to simultaneously control a plurality of different plating methods using different metals and voltages.

KURT T. POTTHOFF.

DISCLAIMER 1,959,799.—*Kurt T. Potthoff*, Brooklyn, N. Y. METHOD AND APPARATUS FOR TREATING MATERIAL. Patent dated May 22, 1934. Disclaimer filed November 17, 1937, by the assignee, *U. S. Gavlanizing & Plating Equipment Corporation*.
Hereby enters this disclaimer to claims 34 and 36.
[*Official Gazette December 7, 1937.*]

same direction through a pair of tanks arranged side-by-side; and subjecting the respective articles to different voltages in the respective tanks.

35. An apparatus comprising at least two tanks placed side-by-side; and transverse carrier bars each movable over both tanks simultaneously and conveyer means engageable with the ends of the bars for driving the bars.

36. An apparatus comprising tanks placed side-by-side; a carrier movable over both tanks simultaneously, and comprising article-carrying conductors over the tanks respectively and insulated from each other.

37. An apparatus comprising a series of tanks; conveyor chains at both sides of the tanks; pushers on opposite points of the respective chains; carrier bars across the tanks moved forward by the pushers; transfer means for picking up and transferring carrier bars from pushers over one tank and transferring them to pushers over another tank; a self starting drive means for driving said chain; and means controlled by the bars for stopping the drive means; the drive means automatically restarting after a predetermined period.

38. A method comprising simultaneously conveying in the same direction at the same speed a plurality of articles arranged side-by-side respectively through a plurality of series of tanks, said series being arranged side-by-side, corresponding tanks being arranged side-by-side and subjecting the articles of the respective series to different liquids and voltages while in some of the corresponding tanks of the respective series; said method resulting in the new function of allowing the same control which controls one plating method to simultaneously control a plurality of different plating methods using different metals and voltages.

KURT T. POTTHOFF.

DISCLAIMER 1,959,799.—*Kurt T. Potthoff*, Brooklyn, N. Y. METHOD AND APPARATUS FOR TREATING MATERIAL. Patent dated May 22, 1934. Disclaimer filed November 17, 1937, by the assignee, *U. S. Gavlanizing & Plating Equipment Corporation*.
Hereby enters this disclaimer to claims 34 and 36.
[*Official Gazette December 7, 1937.*]